(12) United States Patent
Seo et al.

(10) Patent No.: US 7,990,013 B2
(45) Date of Patent: Aug. 2, 2011

(54) SLOTLESS MOTOR

(75) Inventors: Jung Moo Seo, Seoul (KR); Joo Han Kim, Seoul (KR); Se Hyun Rhyu, Bucheon-si (KR); In Soung Jung, Seoul (KR); Seung Bin Lim, Seoul (KR); Jun Hyuk Choi, Seoul (KR); Young Kyoun Kim, Seoul (KR); Bon Gwan Gu, Bucheon-si (KR)

(73) Assignee: Korea Electronics Technology Institute (KR)

( * ) Notice: Subject to any disclaimer, the term of this patent is extended or adjusted under 35 U.S.C. 154(b) by 196 days.

(21) Appl. No.: 12/321,989

(22) Filed: Jan. 28, 2009

(65) Prior Publication Data

US 2009/0315427 A1 Dec. 24, 2009

(30) Foreign Application Priority Data

Jun. 23, 2008 (KR) .................. 10-2008-0058932

(51) Int. Cl.
 *H02K 1/06* (2006.01)
(52) U.S. Cl. ................ 310/216.002; 310/195; 310/179; 310/254.1
(58) Field of Classification Search ........... 310/216.002, 310/195, 179, 254.1
See application file for complete search history.

(56) References Cited

U.S. PATENT DOCUMENTS

| 744,145 | A | * | 11/1903 | Wiard | ............................ 318/767 |
|---|---|---|---|---|---|
| 2,961,747 | A | * | 11/1960 | Lyman | ............................. 29/605 |
| 3,631,278 | A | * | 12/1971 | Snively | ........................... 310/158 |
| 3,634,708 | A | * | 1/1972 | Fisher | ............................ 310/195 |
| 3,678,312 | A | * | 7/1972 | Antonenko | .................... 310/185 |
| 3,781,578 | A | * | 12/1973 | Smith et al. | ...................... 310/52 |
| 3,848,331 | A | * | 11/1974 | Pavlik et al. | ..................... 29/596 |
| 4,401,907 | A | * | 8/1983 | Nozawa | ........................ 310/203 |
| 4,843,269 | A | * | 6/1989 | Shramo | ......................... 310/208 |
| 4,868,970 | A | * | 9/1989 | Schultz et al. | ................... 29/596 |
| 4,914,335 | A | * | 4/1990 | Horton et al. | ................. 310/207 |
| 4,954,739 | A | * | 9/1990 | Schultz et al. | ............ 310/156.43 |
| 5,294,855 | A | * | 3/1994 | Mihalko | ........................ 310/180 |
| 5,313,127 | A | * | 5/1994 | Danley et al. | .................... 310/36 |
| 5,313,131 | A | * | 5/1994 | Hibino et al. | ........... 310/216.002 |
| 5,394,046 | A | * | 2/1995 | Dolgas | .................... 310/216.002 |
| 5,606,791 | A | * | 3/1997 | Fougere et al. | .................. 29/596 |

(Continued)

FOREIGN PATENT DOCUMENTS

EP 1073179 A2 * 1/2001

(Continued)

*Primary Examiner* — Quyen Leung
*Assistant Examiner* — Alex W Mok
(74) *Attorney, Agent, or Firm* — Ober, Kaler, Grimes & Shriver; Royal W. Craig

(57) ABSTRACT

A stator coil of a slotless motor is disclosed in which the stator coil is formed in such a manner that respective both distal ends of two unit coil bodies, each unit coil body arranged to face each other, are respectively coupled to form a plurality of circular coil bodies, each circular coil body having a different inner diameter, and a circular coil body having a smaller inner diameter is sequentially inserted into an inner side of a circular coil body having a larger inner diameter, whereby a horizontal width of the plurality of unit coil bodies of U, V and W phases is equal there among to cause the strength of the magnetic field of U, V and W phases to be equal, and to allow the stator to be accurately manufactured, thereby catering to a designer's intention and markedly simplifying the assembly processes.

4 Claims, 5 Drawing Sheets

U.S. PATENT DOCUMENTS

| | | | |
|---|---|---|---|
| 5,714,828 A * | 2/1998 | Ackermann et al. | 310/216.002 |
| 6,229,241 B1 * | 5/2001 | Ishigami et al. | 310/208 |
| 6,252,327 B1 * | 6/2001 | Matsuzaki | 310/201 |
| 6,351,052 B1 * | 2/2002 | Kim | 310/179 |
| 6,515,393 B2 * | 2/2003 | Asao et al. | 310/184 |
| 6,791,224 B1 * | 9/2004 | Ozawa et al. | 310/179 |
| 6,812,610 B2 * | 11/2004 | Kim et al. | 310/184 |
| 6,911,759 B2 * | 6/2005 | Kalsi | 310/208 |
| 6,940,204 B2 * | 9/2005 | Yamazaki et al. | 310/208 |
| 2001/0011851 A1 * | 8/2001 | Asao et al. | 310/179 |
| 2005/0225197 A1 * | 10/2005 | Nagano et al. | 310/254 |
| 2006/0238058 A1 * | 10/2006 | Koide et al. | 310/156.55 |
| 2007/0103025 A1 * | 5/2007 | Rohrer et al. | 310/179 |

FOREIGN PATENT DOCUMENTS

| | | | |
|---|---|---|---|
| EP | 1079503 A2 * | 2/2001 | |
| JP | 05115141 A * | 5/1993 | |
| JP | 2001069693 A * | 3/2001 | |
| JP | 2001069727 A * | 3/2001 | |
| JP | 2002325404 A * | 11/2002 | |
| JP | 2002330572 A * | 11/2002 | |
| JP | 2002345216 A * | 11/2002 | |
| JP | 2002345217 A * | 11/2002 | |
| KR | 2005075461 A * | 7/2005 | |

* cited by examiner

SLOTLESS MOTOR

CROSS-REFERENCE TO RELATED APPLICATION

The present application is based on, and claims priority from Korean Patent Application No. 10-2008-0058932, filed Jun. 23, 2008, the disclosure of which is incorporated herein by reference in its entirety.

BACKGROUND

1. Field of the Invention

The present invention relates generally to electrical machines, and more particularly to a slotless motor.

2. Description of the Background

Typically, a motor is composed of a stator and a rotor. The stator is arranged at an inner side of a core formed with a plurality of slots, and stator coils are wound in the slots with insulated conductors. The rotor is arranged on a rotating axis with a permanent magnet, and is rotationally installed inside of the stator.

In a case a current is applied to a stator coil of the motor, a magnetic field is generated from the stator coil, and the rotor is rotated by inter-action of the magnetic field formed by the stator coil and the magnetic field generated by the permanent magnet of the rotor.

The stator, as mentioned above, is mounted with slots, each spaced at a predetermined distance, inside of the core, and the slot is arranged with a stator coil wound with insulated conductors. However, the core arranged with the slots there inside has a drawback in that it increases the manufacturing cost, and decreases the output efficiency of motor due to the difficulty in winding the insulated conductors thereon.

As a result, a slotless motor has been developed in which no slots are formed inside the core, insulated conductors are wound to form a plurality of units comprising a coil body (hereinafter referred to as unit coil body), and a stator coil comprising the plurality of unit coil bodies is arranged inside the core.

The slotless motor is structurally simple and is capable of reducing the manufacturing cost since no slots are arranged inside the core. Furthermore, the slotless motor has an advantage in that it is arranged with a plurality of unit coil bodies in a uniform high density such that vibration and noise caused by torque ripple are reduced and motor output efficiency is very high.

In manufacturing the stator coil of the conventional slotless motor, the insulating conductor windings are formed in a predetermined shape, such as a rectangular or trapezoid shape, to form a unit coil body, and a plurality of unit coil bodies are alternatively circumferentially arranged to allow one side of the unit coil body to be positioned back and forth. Furthermore, each of the plurality of unit coil bodies is arranged with an offset to allow both sides of a unit coil body to be positioned up and down.

However, the conventional slotless motor suffers from drawbacks in that accurate offset designing and manufacturing processes are required for a precise arrangement of the plurality of unit coil bodies, and a relative distance error between the plurality of unit coil bodies is generated to decrease an output characteristic of the motor in the course of continuously arranging the plurality of unit coil bodies.

SUMMARY OF THE INVENTION

In view of the aforementioned problems, it is an object of the present disclosure to provide a slotless motor capable of simply and accurately coupling a plurality of unit coil bodies.

The following detailed description is merely exemplary in nature and is not intended to limit this disclosure or the application and uses of the disclosure. Furthermore, other advantages and technical features of the disclosure that are not disclosed will be apparent to those skilled in the art from the following description.

The slotless motor according to the disclosure includes a stator and a rotor, where the stator includes a core and a stator coil mounted inside the core.

The stator coil comprises a plurality of unit coil bodies arranged in pairs, each unit coil body being formed from an insulated conductor wound in to define a geometric form with opposed distal ends separated by a predetermined width. The horizontal width (distal end to end) of each of the plurality of unit coil bodies is established to be differentiated from the others as described below.

Each unit coil body of each pair is arranged to face the other paired unit coil body in a circular configuration with overlapping opposed distal ends. The overlapping distal ends of each pair of unit coil bodies are coupled together to form a circular coil body of predetermined inner diameter. Again, the horizontal width (distal end to end) of each of the plurality of unit coil bodies is predetermined such that when the pairs are structurally arranged as described above, the circularly-arranged pairs will have different inner diameters (progressively increasing). Furthermore, the horizontal width (distal end to end) of each of the plurality of unit coil bodies is calculated such that when the unit coil bodies are electrically connected to define phase windings of U phase, V phase and W phase, the sum of the width (distal end to end) of each phase-connected unit coil body pair is identical.

Because the circularly-coupled pairs of unit coil bodies have different internal diameters, the circularly-coupled pair of unit coil bodies having the smallest inner diameter may be sequentially inserted into a circularly-coupled pair of unit coil bodies having a larger inner diameter, and so on, until all the pairs are concentrically arranged.

Each circular coil body may have a unit coil body having a different horizontal width to thereby allow having a different inner diameter.

The circular coil body may be formed in such a manner that an external side of both distal ends of a unit coil body having a smaller horizontal width is overlapped by an inner side of both distal ends of a unit coil body having a larger horizontal width.

The unit coil bodies are coupled in a plural shape to form bodies of U phases, V phases and W phases, and each horizontal width of the unit coil bodies of U phases, V phases and W phases is the same.

The plurality of circular coil bodies is inserted at a predetermined offset angle.

BRIEF DESCRIPTION OF THE DRAWINGS

Hereinafter, implementations that are not to be taken in a limiting sense are described in detail with reference to the accompanying drawings. The same reference numerals or symbols are used to identify the same or corresponding elements throughout the drawings.

DETAILED DESCRIPTION

The following exemplary implementations are merely exemplary and are made for the purpose of illustrating the general principles of the present disclosure. The implementations are not meant to limit the inventive concepts claimed herein. For the purpose of clarity, technical material that is known in the technical fields related to the disclosure has not been described in detail so that the disclosure is not unnecessarily obscured. Various modifications to the implementations will be readily apparent to those skilled in the art and the generic principles herein may be applied to other exemplary implementations.

Figure 1:
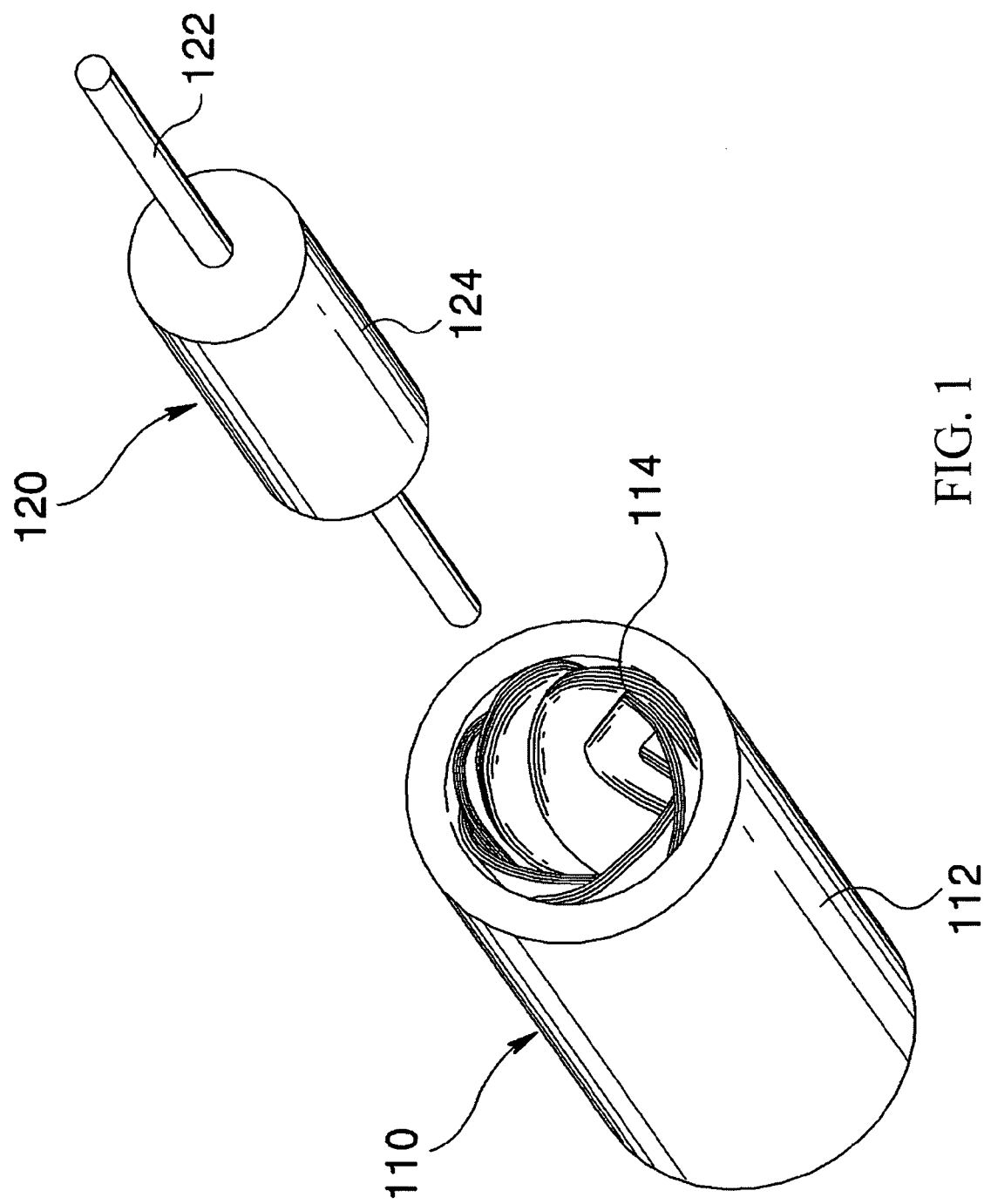
FIG. 1 is an exploded perspective view illustrating a configuration of an exemplary implementation of a slotless motor according to the present disclosure.

FIG. 1 is an exploded perspective view illustrating an exemplary implementation of a slotless motor according to the present disclosure, where reference numeral 110 defines a stator. The stator 110 includes a core 112, preferably a hollow cylinder, and a stator coil 114 mounted inside the core 112.

Reference numeral 120 is a rotor. The rotor may include a rotation shaft 122, and a permanent magnet 124 mounted externally to the rotation shaft 122. The slotless motor thus configured is mounted with the rotor 120 rotationally inserted inside the stator 110.

When a predetermined operating voltage is supplied to the stator coil 114, a magnetic field is formed in the stator coil 114, and the rotor 120 is rotated by interaction of the magnetic field generated by the stator coil 114 and the magnetic field generated by the permanent magnet 124 of the rotor 120. The stator coil 114 is formed by a plurality of unit coil bodies in the slotless motor as described below.

The stator coil 114 is made up of a plurality of unit coil bodies 200 coupled together, each unit coil body being formed from an insulated conductor wound in one or more coil windings defining a geometric form with opposed distal ends.

Figure 2:
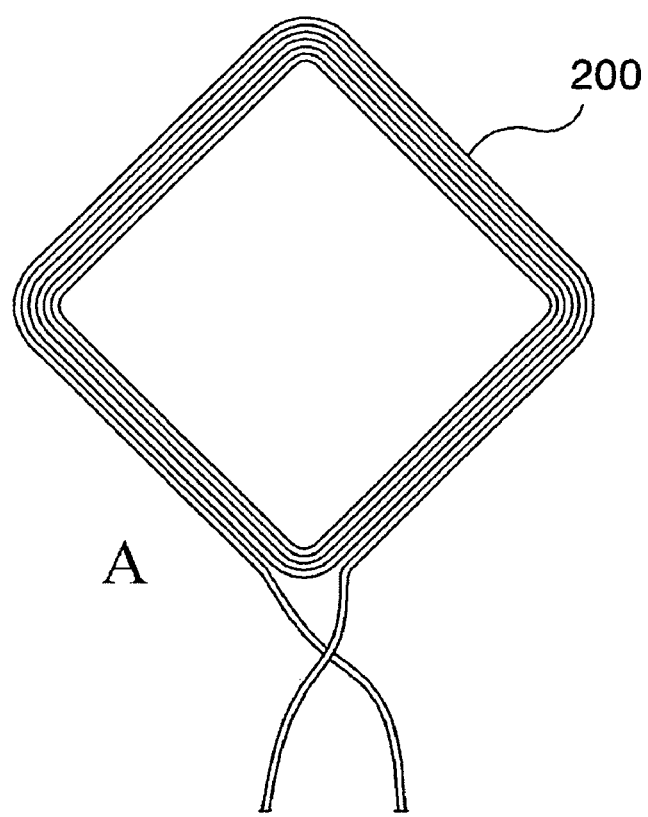
FIGS. 2a, 2b and 2c are schematic views illustrating various shapes and thickness of a unit coil body comprising a stator coil in the slotless motor according to the present disclosure.
Figure 2:
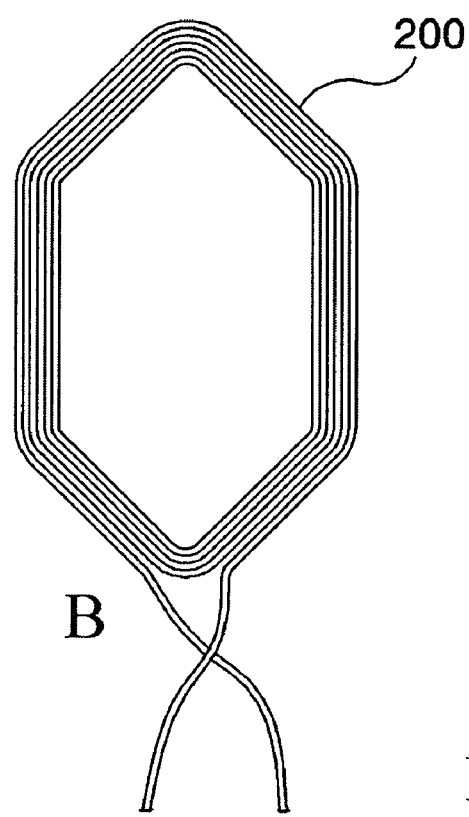
Figure 2C:
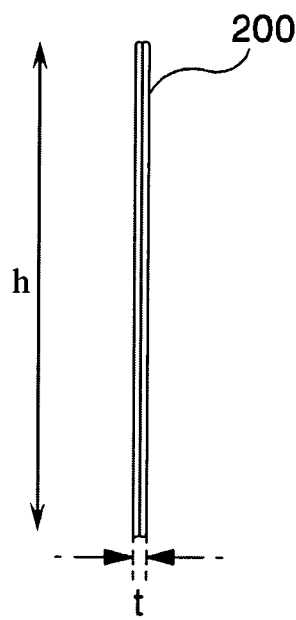

FIGS. 2A, 2B and 2C are schematic views illustrating exemplary configurations of a unit coil body 200 as used in the stator coil 114 in the slotless motor of the present disclosure. Each of the plurality of unit coil bodies 200 making up the stator coil 114 are formed by a singular wound insulated conductor, wound one or more times, and in one or more layers, to define a geometric form, for example, a trapezoidal shape such as shown in FIG. 2A, or in a hexagonal shape as shown in FIG. 2B. One skilled in the art should readily understand that the unit coil bodies 200 may be formed by winding the insulated conductors in various geometric forms, e.g., a circular shape or a rectangular shape, in addition to the trapezoidal shape and the hexagonal shape of FIGS. 2A & B.

Referring to FIG. 2C, the unit coil bodies 200 may have a predetermined thickness (t) defined by the insulated conductors being wound in two fold or three fold layers, and a predetermined height (h) defined by the vertical extent of the geometric form. Preferably, all of the unit coil bodies 200 making up the stator coil 114 have the same thickness (t) and the same height (h). However, the unit coil bodies 200 have varied horizontal widths, as further depicted in FIG. 3.

Figure 3:
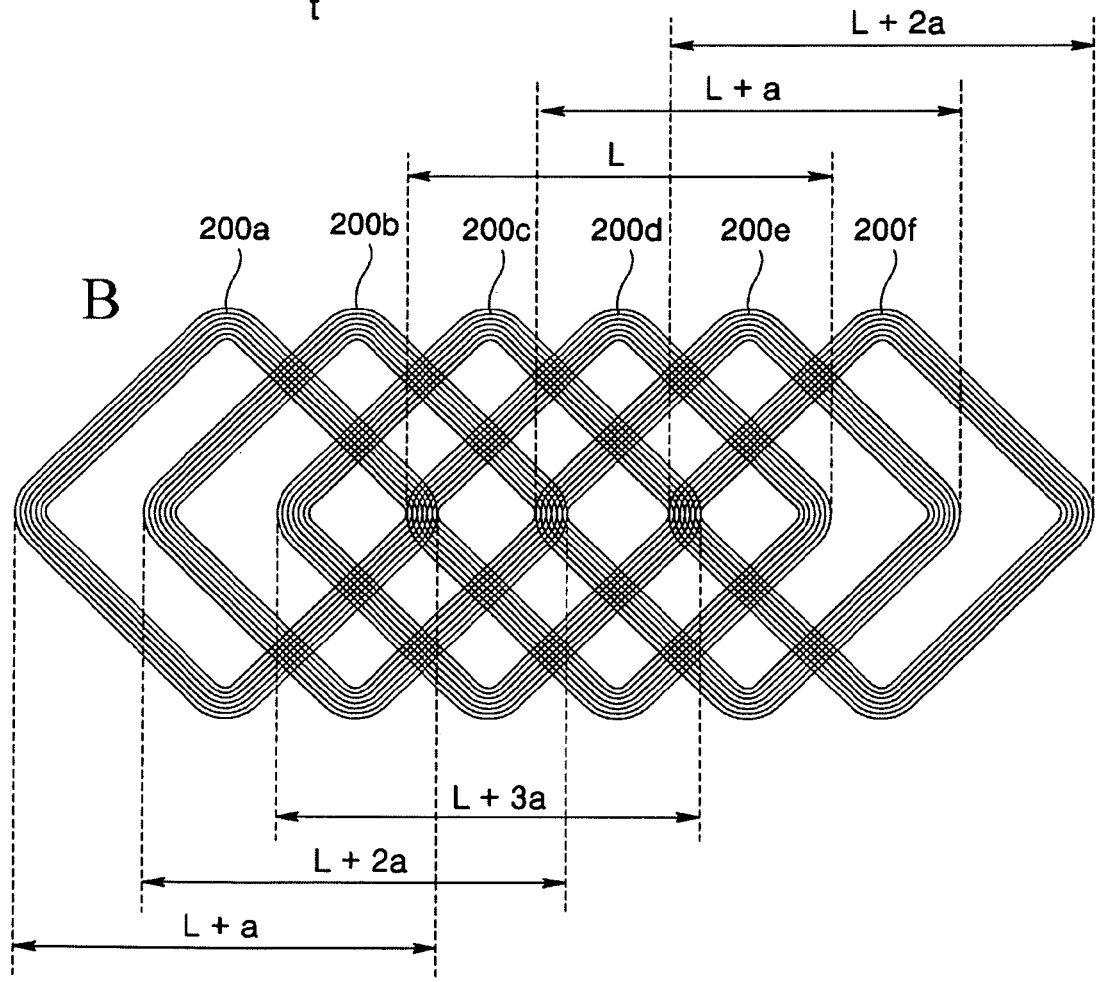
FIG. 3 is a schematic view illustrating a spread stator coil that is used for the present disclosure.

FIG. 3 illustrates an exemplary stator coil 114 that includes a pair of two unit coil bodies 200a, 200b into which a voltage of U phase is supplied, a pair of two unit coil bodies 200c, 200d into which a voltage of V phase is supplied, and a pair of two unit coil bodies 200e, 200f into which a voltage of W phase is supplied.

Each of the plurality of unit coil bodies (200a, 200b) (200c, 200d) (200e, 200f) are formed by winding the insulated conductors in the same thickness (t) and the same height (h), but in different horizontal widths which are a function of a base measure (L) plus some multiple of incremental measure (a). For example, mathematically the horizontal width of the unit coil bodies (200a, 200b) of U phase is defined by windings of width L+a and L+2a respectively, the horizontal width of the unit coil bodies (200c, 200d) of V phase is defined by windings of L+3a and L respectively, and the horizontal width of the unit coil bodies (200e, 200f) of W phase is defined by windings of L+a and L+2a respectively.

Using this mathematical construct it can be seen that the combined horizontal width of each pair of unit coil bodies 200 corresponding to each phase, U, V, W, is the same. Specifically, the combined horizontal width of the first pair of unit coil bodies (200a, 200b) of the U phase is equal to the combined horizontal width of the second pair of unit coil bodies (200c, 200d) of V phase, which is equal to the combined horizontal width of the third pair of unit coil bodies (200e, 200f) of W phase in the illustrated embodiment, all summing to 2L+3a. This ensures a uniform polyphase distribution of coils. The unit coil bodies 200 are electrically connected in polyphase (here three-phase) windings distributed uniformly on the slotless surface of the armature core 112. The difference in the horizontal width of the two unit coil bodies corresponding to each phase (200a, 200b), (200c, 200d), (200e, 200f) is the distance 'a', which structurally allows each individual unit coil 200a, 200b, 200c, 200d, 200e, 200f to be paired with another coil oriented 180 degrees apart, and wrapped about the armature core 112 in a circular facing relationship with overlapping (coupled) distal ends, as described below.

Figure 4:
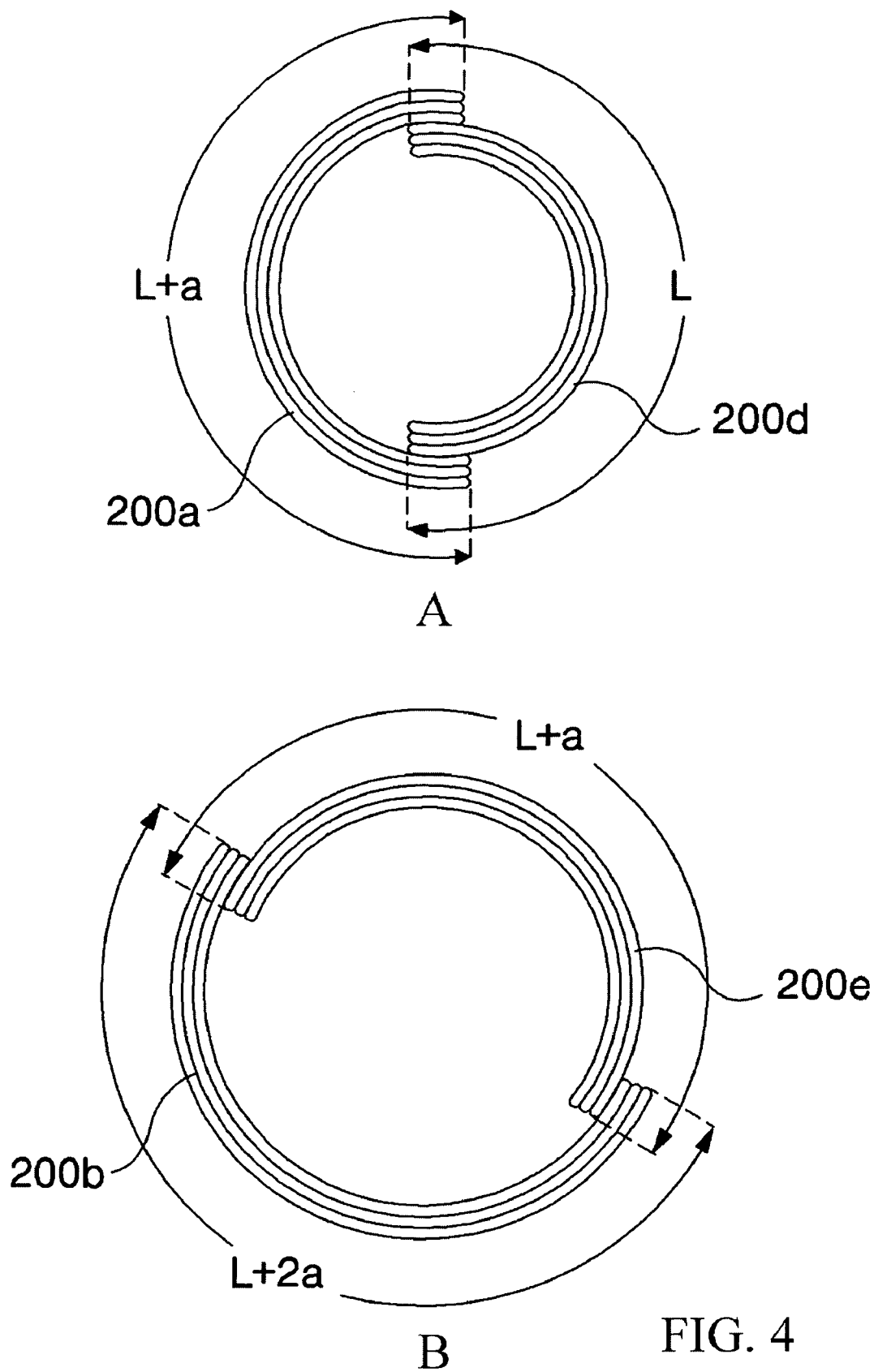
FIGS. 4a, 4b and 4c are schematic views illustrating a round coil body formed by coupling two unit coil bodies each facing each other in a slotless motor according to the present disclosure.
Figure 4:
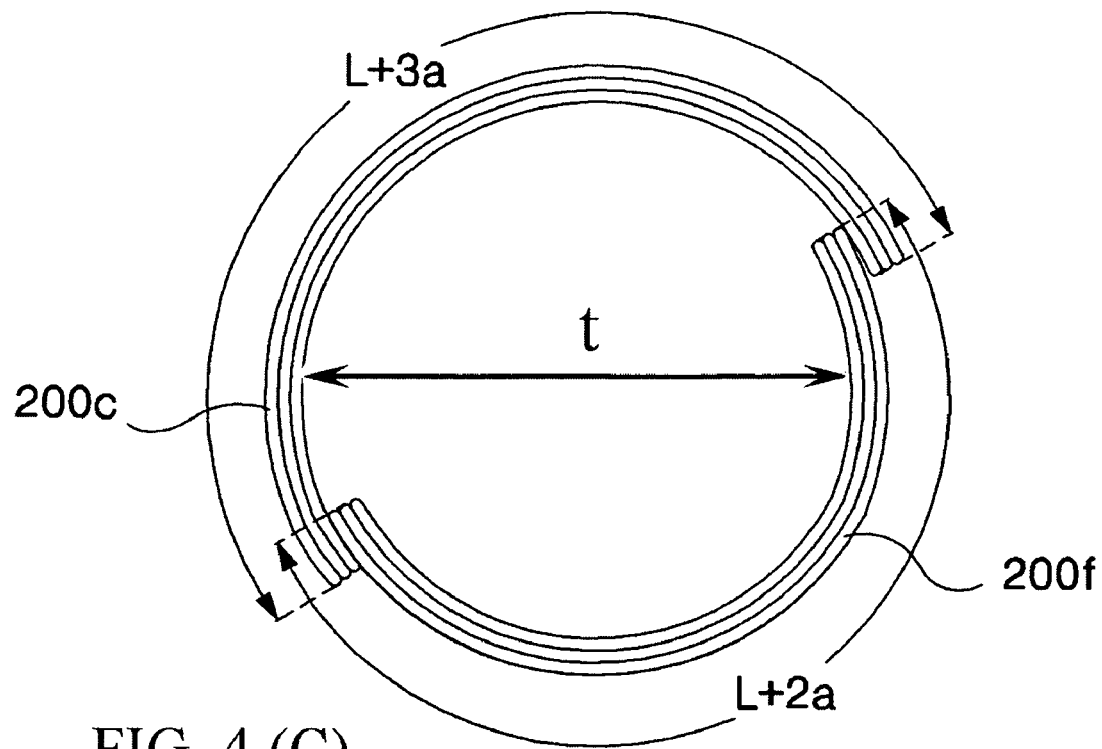

This overlapping structural distribution is as follows. Referring to FIG. 4A, a first unit coil body 200a of U phase and a second unit coil body 200d of V phase, each unit coil body facing each other, are configured in a circular shape to form a circular coil body. That is, the opposed distal ends of the first unit coil body 200a of U phase are furled inward such that a cross-section of the first unit coil body 200a (from a top or bottom view) defines a 180 degree arc. Similarly, the opposed distal ends of the second unit coil body 200a of V phase are furled inward to define a similar 180 degree arc. Both distal ends of the second unit coil body 200d of V phase (of horizontal width 'L') are overlapped by both distal ends of the first unit coil body 200a of U phase (of horizontal width 'L+a'), and the ends are mechanically (not electrically) coupled together to form a unitary circular coil body. The same is done for the remaining unit coil bodies 200b, 200c, 200e, 200f.

Referring now to FIG. 4B, a third unit coil body 200b of U phase and a fourth unit coil body 200e of W phase, each unit coil body facing each other, are coupled in a circular shape just as above to form a circular coil body. Again, both distal ends of the fourth unit coil body 200e of W phase (of horizontal width 'L+a') are overlapped by both distal ends of the third unit coil body 200b of U phase (of horizontal width 'L+2a'), and the ends are mechanically (not electrically) coupled together to form a unitary circular coil body.

Referring now to FIG. 4C, a fifth unit coil body 200c of V phase and a sixth unit coil body 200f of W phase, each unit coil body facing each other, are coupled in a circular shape just as above to form a circular coil body. Again, both distal ends of the fifth unit coil body 200c of V phase (of horizontal width 'L+3a') overlap both distal ends of the sixth unit coil body 200f of W phase (of horizontal width 'L+2a'), and the ends are mechanically (not electrically) coupled together to form a unitary circular coil body.

Figure 5:
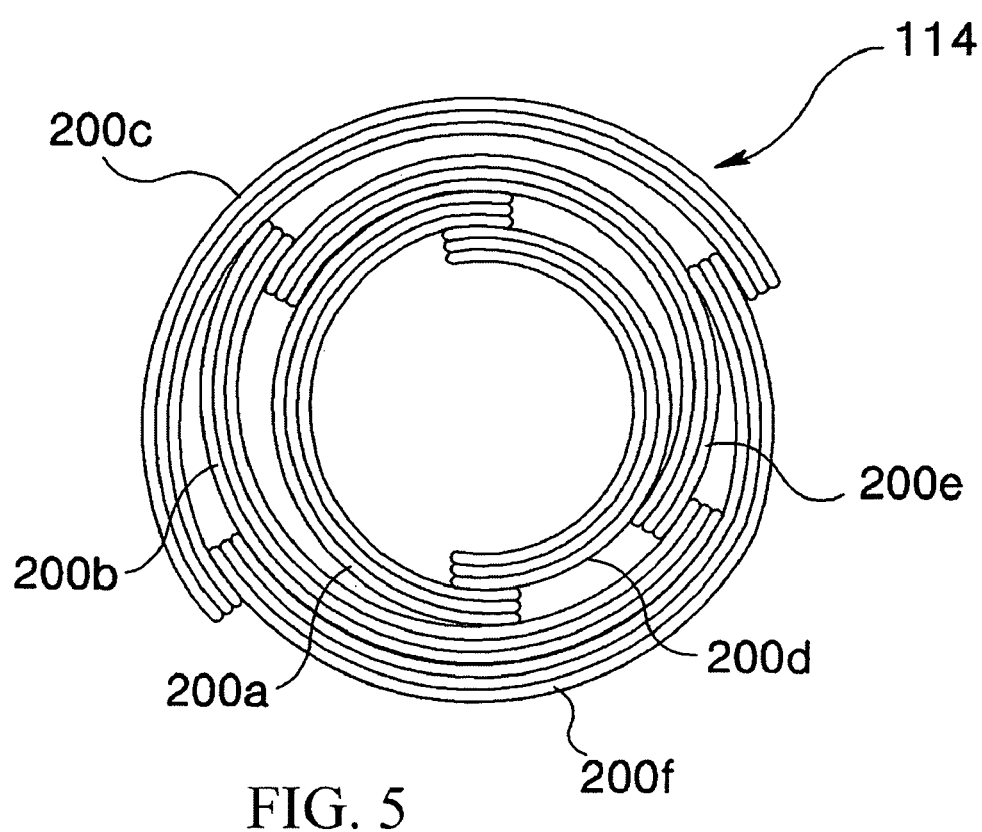
FIG. 5 is a schematic view illustrating a coupled state of a plurality of round coil bodies in a slotless motor according to the present disclosure.

Next, as shown in FIG. 5, the inner side of the circular coil body having the largest inner diameter (here comprising the fifth unit coil body 220c of V phase and the sixth unit coil body 200f of W phase) is inserted around the circular coil body having the mid-sized inner diameter (comprising the third unit coil body 200b of U phase and the fourth unit coil body 200e of W phase). The inner side of the middle-sized circular coil body (formed by third unit coil body 200b of U phase and fourth unit coil body 200e of W phase) is inserted around the circular coil body having the smallest inner diameter (comprising the first unit coil body 200a of U phase and the second coil body 200d of V phase). This yields three concentrically arranged coil bodies forming the stator coil 114.

The circular coil body comprising the third unit coil body 200b of U phase and the fourth unit coil body 200e of W phase is radially offset by a +60-degree angle from the circular coil body comprising the first unit coil body 200a of U phase and the second coil body 200d of V phase, and the circular coil body comprising the fifth unit coil body 220c of V phase and the sixth unit coil body 200f of W phase is radially offset by a −60-degree angle. Finally, all three circular coil bodies are coupled together in the configuration shown in FIG. 5 to form the stator coil 114.

Having now described the mechanical arrangement, it should be noted with reference back to FIG. 3 that the base value 'L' in the horizontal width of the unit coil body 200 is a value predetermined in accordance with the size of the core 112 to be manufactured, and the value of 'a' may range up to a value 2t, where t is equal to the inner diameter of the round coil body, in a case a circular coil body is formed by overlapping both distal ends of a set of two unit coil bodies 200 (to be described further later).

The stator coil 114 formed from the plurality of circular coil bodies coupled as shown in FIG. 5 may be inserted into a pre-manufactured circular jig (not shown) and, in consideration of the desired gap with the rotor 120, pressure is applied to the stator coil 114 from outside to conform it to a predetermined thickness.

The foregoing configuration is made possible by the horizontal end-to-end widths of the unit coil bodies 200a, 200b of U phase, the unit coil bodies 200c, 200d of V phase and the unit coil bodies 200e, 200f of W phase being equal, and aligned in an accurate position, thereby forming the stator coil 114. Specifically, the combined horizontal width L+a plus L+2a of the unit coil bodies 200a, 200b of U phase sums to 2L+3a. The combined horizontal width L+3a plus L of the unit coil bodies 200c, 200d of V phase sums to 2L+3a. The combined horizontal width L+a plus L+2a of the unit coil bodies 200e, 200f of W phase sums to 2L+3a. Thus, it can be seen that the respective horizontal widths of the unit coil bodies (200a, 200b), (200c, 200d), (200e, 200f) of U phases, V phases and W phases are identical, which is 2L+3a.

Therefore, when an operating voltage is supplied to the unit coil bodies corresponding to each phase (200a, 200b), (200c, 200d), (200e, 200f) of U phase, V phase and W phase, respectively, to generate a magnetic field, the intensity of magnetic field generated by the unit coil bodies (200a, 200b), (200c, 200d), (200e, 200f) of U phase, V phase and W phase can be equalized. When current is supplied to unit coil bodies (200, 202), (204, 206), (208, 210) of U phase, V phase and W phase to generate a magnetic field, the intensity of magnetic field generated by the unit coil bodies (200, 202), (204, 206), (208, 210) of U phase, V phase and W phase can be equalized, and the rotational force of the slotless motor can be uniformly generated.

Although the foregoing description has described a stator coil configured with U, V and W phases each phase having two unit coil bodies, it should be apparent that the present disclosure may be implemented by U, V and W phases each phase having four or six unit coil bodies.

Although a few exemplary implementations of the present disclosure have been shown and described, it will be appreciated by those skilled in the art that changes may be made in these implementations without departing from the principles and spirit of the disclosure, the scope of which is defined in the appended claims and their equivalents.

What is claimed is:

1. A slotless motor, comprising:
   a rotor having a permanent magnet mounted along a rotating axis;
   a stator formed with a stator coil inside a core, said rotor being rotationally mounted inside said stator, the stator coil further comprising at least one pair of unit coil bodies, each unit coil body being formed from an insulated conductor wound in at least one coil winding defining a geometric form with opposed distal ends, and each unit coil body of each pair being arranged to face the other unit coil body of said pair in an arcuate configuration with overlapping opposed distal ends, the overlapping distal ends of each unit coil body of each pair being joined together to form a circular coil body;
   wherein the stator coil further comprises a plurality of pairs of unit coil bodies, said pairs of unit coil bodies being joined together to form circular coil bodies of progressively increasing inner diameters, and circular unit coil body pairs of smaller diameters are inserted coaxially into circular unit coil body pairs of larger diameters;
   wherein each circular coil body of is formed with one unit coil body of smaller horizontal width overlapped at the distal ends by the distal ends of another unit coil body having a larger horizontal width.

2. The slotless motor of claim 1, wherein the unit coil bodies are electrically coupled together to form three-phase stator windings of U phase, V phase and W phase, and the combined horizontal width of the unit coil bodies of each electrically-coupled pair is equal to the combined horizontal width of the unit coil bodies of all other electrically-coupled pairs.

3. The slotless motor of claim 1, wherein the plurality of circularly-coupled unit coil body pairs of smaller diameters are inserted coaxially into circularly-coupled unit coil body pairs of larger diameters at a predetermined offset angle.

4. The slotless motor of claim 1, wherein each of the plurality of circular coil bodies defines a geometric form with opposed distal ends separated by a predetermined horizontal width to produce pairs of unit coil bodies joined together to form circular coil bodies of progressively increasing inner diameters.

* * * * *